United States Patent [19] [11] 4,194,282
Byrd, Jr. [45] Mar. 25, 1980

[54] METHOD AND APPARATUS FOR FILLING SEAMS BETWEEN ADJACENT FIBER BLANKET INSULATION MODULES

[75] Inventor: Carlisle O. Byrd, Jr., Houston, Tex.

[73] Assignee: Johns-Manville Corporation, Denver, Colo.

[21] Appl. No.: 901,114

[22] Filed: Apr. 28, 1978

[51] Int. Cl.[2] .................... B23P 11/02
[52] U.S. Cl. .................... 29/451; 29/235; 52/173 R; 52/509; 404/48; 404/49; 404/74; 404/87
[58] Field of Search .................... 29/450, 451, 235; 404/48, 49, 65, 72, 74, 87; 52/396, 743, 173 R, 509

[56] References Cited

U.S. PATENT DOCUMENTS

| | | | |
|---|---|---|---|
| 1,320,222 | 10/1919 | Gage | 404/87 X |
| 2,068,035 | 1/1937 | Meyer | 29/235 UX |
| 2,276,542 | 3/1942 | Kovanda | 404/87 |
| 2,924,008 | 2/1960 | Haushalter | 29/451 |
| 3,246,390 | 4/1966 | Brown | 29/235 |
| 3,971,184 | 7/1976 | Wagoner | 52/173 R X |

*Primary Examiner*—Charlie T. Moon
*Attorney, Agent, or Firm*—Robert M. Krone; Joseph J. Kelly; James W. McClain

[57] ABSTRACT

Gaps or seams between adjacent modular refractory fiber blanket insulation modules are filled by inserting therein strips of refractory fiber blanket. The strips are bent into a U-shape over a blade or plate and then inserted between two spreader members, called lubricators, to overcome the tendency of the blanket in the strip to adhere to the blanket in the module.

11 Claims, 3 Drawing Figures

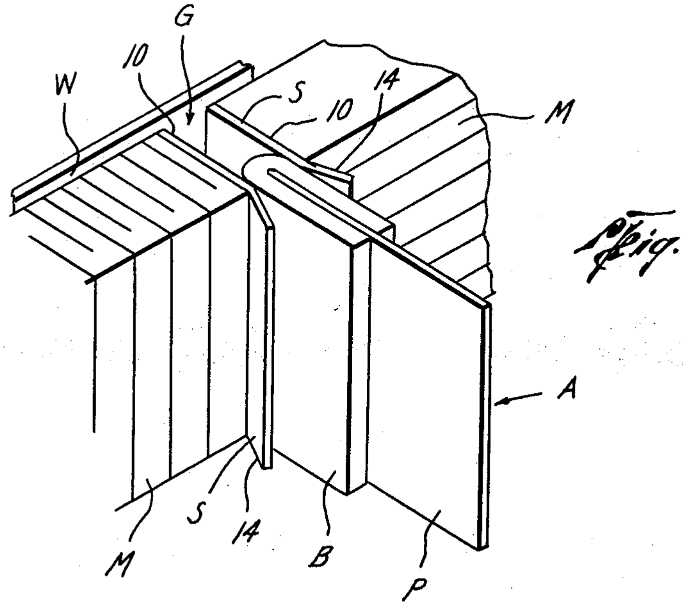
Fig. 1
Fig. 2
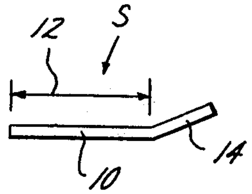
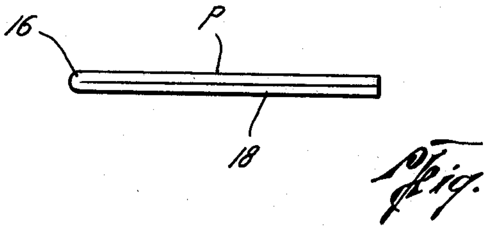
Fig. 3

METHOD AND APPARATUS FOR FILLING SEAMS BETWEEN ADJACENT FIBER BLANKET INSULATION MODULES

BACKGROUND OF THE INVENTION

1. Field of the Invention

The present invention relates to insulation of furnaces and like high-temperature equipment with modular refractory fiber blanket modules.

2. Description of Prior Art

Modular refractory fiber blanket furnace systems, such as the type disclosed in U.S. Pat. Nos. 3,952,470; 4,001,996; and 4,055,926 have recently come into use for insulating walls of furnaces and other types of high temperature equipment. Once installed, the modules often exhibit a degree of shrinkage due to vitrification of the refractory fibers, often forming gaps or seams between adjacent modules. Unless these gaps or seams are corrected by being filled with insulating material, hot paths in lieu thereof are formed between the inner surfaces of the modules exposed to interior heat conditions in the furnace and the furnace wall, impairing insulating efficiency of the modules. However, the nature of the refractory material in lieu thereof is such that the loose, pliable blanket strips could not heretofore easily be inserted into these relatively small gaps or seams.

SUMMARY OF INVENTION

Briefly, the present invention provides a new and improved apparatus and method for filling a gap or seam between refractory fiber blanket insulation modules. The gap or seam is filled with refractory fiber blanket material of the type in the modules in order to protect against heat leaks which might otherwise impair the insulation efficiency of the furnace insulation.

Spacer plate members are inserted into a gap between adjacent modules on opposite sides. A length of refractory fiber blanket sufficient to fill the gap is then bent over a pusher blade and then forced into the gap with the pusher blade. The spacer plates are preferably configured to facilitate insertion of the blanket material into the gap while also exerting a compressive force thereon. The spacer plates also protect against the tendency of the folded fiber blanket to adhere with the blanket of the module during insertion. After the blanket is inserted to fill the gap, the spacer blades and pusher blades are withdrawn. The present invention has been found to force the blanket into the gap and simultaneously subject such material to a compressive force tending to retain the filling blanket in place in the gap.

BRIEF DESCRIPTION OF THE DRAWINGS

FIG. 1 is an isometric view of a gap or seam between insulating modules being filled according to the present invention;

FIG. 2 is a side view of a spacer plate of the present invention; and

FIG. 3 is a side view of a pusher plate of the present invention.

DESCRIPTION OF THE PREFERRED EMBODIMENT

In the drawings, the letter A designates generally an apparatus according to the present invention for filling a gap or seam G between adjacent refractory fiber blanket insulating modules M on a wall W of a furnace or other high temperature equipment, or between hard brick in expansion joints in ducts and walls, with a strip B of refractory fiber blank material. The modules may be, for example, of the type set forth in U.S. Pat. Nos. 3,952,470; 4,001,996; and, 4,055,926, although it should be understood that the present invention may be used with other types of refractory fiber blanket insulating modules as well.

The apparatus A includes a pair of spacer plate members S (FIGS. 1 and 2) and a pusher plate member P (FIGS. 1 and 3). The spacer plate members S are preferably formed from a material having a low coefficient of friction with the refractory fiber material of the modules M in order to thereby overcome any tendency of the refractory fiber material to adhere with the modules M and resist insertion. Suitable materials for the plate members S, for example, are stainless steel or aluminum. The spacer plate members S facilitate insertion of the blanket B, since the blanket B and the modules M do not move easily past each other, and accordingly the spacer plate members in effect lubricate passage of the blanket B into the gap G between the modules M. Each of the spacer plate members S has an inner portion 10 extending inwardly a length (as indicated by arrow 12) equal to or exceeding the thickness of the modules M so that the plate members S may be inserted fully into the seam G until contact is made by the inner portion 10 with the wall W of the furnace. The spacer plate members S are further of a width substantially equal to the width of the adjacent modules M and the seam G between them to be filled with the blanket B. Each of the plate members S has an outer portion 14 for extending away at an angle from the inner portion 10, for reasons to be set forth below.

The pusher plate member P is formed with a blunt leading edge 16 and may be formed by folding a metal plate 18 into a U-shaped fold (FIG. 3) or from a single plate (FIG. 1). The blanket B is wrapped or bent over the pusher plate member P in a U-shaped configuration (FIG. 1) and is forced into the gap between the spacer plate members S by the pusher plate member P. If the gap G is relatively small so that resistance to entry of the blanket B is relatively high, the spacer plates S may be forced apart to widen the gap G or the pusher member P may be forced inwardly by a hammer or other suitable means. The blunt leading edge 16 of the pusher plate member P contacts the fiber material of the blanket B wrapped thereover and forces the blanket B into place while protecting the fiber material of the blanket B against cutting and similar damage.

In filling gaps or seams G in accordance with the present invention, the spacer plate members S are first inserted into the gap G until the inner portions 10 contact the wall W of the furnace. If the gap G is small, the spacer plate members S may be driven or forced into place. The blanket material B is then bent or wrapped over the pusher plate member P (FIG. 1) and inserted between the tapering outer portions 14 of the spacer plate members S. It is to be noted that the tapering portions 14 decrease the available area for the blanket material B as the pusher plate P moves such material inwardly. With the spacer plate members S of this configuration, compressive force is exerted on the fiber material of the blanket B by spreader members as the material is forced inwardly by the pusher plate member P, thereby facilitating retention of the blanket material B in place in the gap between the modules M during extended service usage. When the blanket B has been fully inserted into the gap G, it it held in place by the pusher plate member P while the spacer plate members S are individually withdrawn. The pusher plate member P is thereafter withdrawn and the friction between the blanket B and the modules M, as well as the compressive force exerted thereon, retains the blanket member B in place filling the gap G and preventing the formation of hot paths in the gap between adjacent modules M, increasing the service life and usage of the furnace insulation modules M.

The foregoing disclosure and description of the invention is illustrative and explanatory thereof and various changes in the size, shape and materials, as well as in the details of the preferred embodiment may be made without departing from the spirit of the invention.

I claim:

1. Apparatus for inserting refractory fiber blanket material to fill a gap or seam between adjacent refractory fiber modules, comprising:

(a) plural spacer plate members for insertion into a gap or seam between adjacent modules to permit insertion therein of the fiber material, wherein each of said plural spacer plate members comprises:
  (i) a plate member having an inner portion extending inwardly a length substantially equal to the thickness of the modules;
  (ii) said plate member having a width along at least said inner portion substantially equal to the width of the seam to be filled; and
  (iii) said plate member further having an outer portion extending away from said gap or seam and said inner portion at an angle thereto to exert a compressive force on the fiber material as the material is forced inwardly by a pusher means; and
(b) said pusher means for forcing the fiber material into said plural spacer plate members to fill the gap between adjacent modules.

2. The apparatus of claim 1, wherein each of said plural spacer plate members is formed from a material having a low coefficient of friction with the refractory fiber material to thereby overcome any tendency of such material to adhere and resist insertion.

3. The apparatus of claim 2, wherein each of said plural spacer plate members is formed from aluminum.

4. The apparatus of claim 2, wherein each of said plural spacer plate members is formed from stainless steel.

5. The apparatus of claim 1, wherein said pusher means comprises:

a substantially flat pusher blade having a blunt leading edge for contacting the fiber material and forcing same into place while protecting such fiber material against cutting and similar damage.

6. The apparatus of claim 9, wherein said pusher blade comprises:

first and second blade members extending away from said leading edge and forming a substantially U-shaped junction at said blunt leading edge.

7. A method of filling gaps or seams between adjacent refractory fiber modules with refractory fiber blanket material, utilizing the apparatus of claim 1 and comprising the steps of:

(a) inserting said spacer plate members between modules adjacent the gaps to permit the fiber material to be inserted between the gap;
(b) forcing the fiber material between the spacer plate members and into the gap; and
(c) withdrawing the spacer plate members.

8. The method of claim 7, wherein said step of forcing comprises:

forcing the fiber material inwardly between the spacer plate members with a pusher blade.

9. The method of claim 8, further including the step of:

folding the fiber material over the pusher blade prior to said step of forcing.

10. The method of claim 7, wherein said step of withdrawing comprises:

(a) withdrawing each of said spacer plate members individually while holding the pusher blade in place; and
(b) subsequently withdrawing said pusher blade.

11. Apparatus for inserting refractory fiber blanket material to fill a gap or seam between adjacent refractory modules, consisting of:

(A) plural spacer plate members for insertion into a gap or seam between adjacent modules to permit insertion therein of the fiber material, wherein each of said plural spacer plate members consists of:
  (a) a plate member having an inner portion extending inwardly a length substantially equal to the thickness of the modules;
  (b) said plate member having a width along at least said inner portion substantially equal to the width of the seam to be filled; and
  (c) said plate member further having an outer portion extending away from said gap or seam and said inner portion at an angle thereto to exert a compressive force on the fiber material as the material is forced inwardly by said pusher means; and
(B) pusher means for forcing the fiber material into said plural spacer plate members to fill the gap between adjacent modules.

* * * * *

UNITED STATES PATENT AND TRADEMARK OFFICE

CERTIFICATE OF CORRECTION

PATENT NO. : 4,194,282

DATED : March 25, 1980

INVENTOR(S) : C. O. Byrd, Jr.

It is certified that error appears in the above-identified patent and that said Letters Patent are hereby corrected as shown below:

Column 1, line 21, "in lieu thereof" should be omitted

Column 4, line 3, (Claim 6) number "9" should be --5--

Signed and Sealed this

*Eighth* Day of *July 1980*

[SEAL]

*Attest:*

SIDNEY A. DIAMOND

*Attesting Officer* *Commissioner of Patents and Trademarks*